United States Patent [19]

Pedersen

[11] Patent Number: 4,890,511

[45] Date of Patent: Jan. 2, 1990

[54] FRICTION REDUCTION IN A DIFFERENTIAL ASSEMBLY

[75] Inventor: Harry Pedersen, Rochester, N.Y.

[73] Assignee: D-K Gleason, Inc., Rochester, N.Y.

[21] Appl. No.: 111,226

[22] Filed: Oct. 22, 1987

[51] Int. Cl.$^4$ .............................................. F16H 1/38
[52] U.S. Cl. ......................................... 74/715; 74/710
[58] Field of Search ..................... 74/715, 710, 710.5, 74/711

[56] References Cited

U.S. PATENT DOCUMENTS

| | | | |
|---|---|---|---|
| 1,090,082 | 3/1914 | Muehl | 74/715 |
| 1,195,314 | 8/1916 | Williams | 74/715 |
| 1,294,040 | 2/1919 | Brown | 74/715 |
| 1,373,657 | 4/1921 | Finefrock | 74/715 |
| 1,941,645 | 1/1934 | Walter | 74/715 |
| 2,070,569 | 2/1937 | Asam | 74/715 |
| 2,203,683 | 6/1940 | Frederickson | 74/715 |
| 2,559,916 | 7/1951 | Gleasman | 74/715 |
| 2,651,215 | 9/1953 | Schoenrock | 74/714 |
| 2,859,641 | 11/1958 | Gleasman | 74/715 |
| 2,972,265 | 2/1961 | Walter | 74/711 |
| 3,494,226 | 2/1970 | Biddle | 74/711 |
| 3,706,239 | 12/1972 | Myers | 74/715 |
| 3,893,351 | 7/1975 | Baremor | 74/710.5 |
| 3,902,237 | 9/1975 | Benjamin | 74/715 |
| 4,106,359 | 8/1978 | Wolfe et al. | 74/424.8 R |
| 4,191,071 | 3/1980 | Gleasman et al. | 74/715 |
| 4,269,086 | 5/1981 | Altmann | 74/711 |
| 4,365,524 | 12/1982 | Dissett et al. | 74/715 |
| 4,491,035 | 1/1985 | Gleasman et al. | 74/715 |
| 4,491,036 | 1/1985 | Stritzel | 74/715 |
| 4,495,835 | 1/1985 | Gleasman | 74/715 |
| 4,512,211 | 4/1985 | Stritzel | 74/714 X |
| 4,724,721 | 2/1988 | Gleasman et al. | 74/715 |

FOREIGN PATENT DOCUMENTS 617012 3/1961 Canada .

Primary Examiner—Dwight G. Diehl
Attorney, Agent, or Firm—Stonebraker, Shepard & Stephens

[57] ABSTRACT

A differential gear assembly for vehicles is provided between a pair of drive axles (12), (14) are received in bores (10) formed in the sides of a differential housing (4), and wherein axially aligned worm or side gears (18, 18') are coupled to each axle end for meshing engagement with torque transfer gears (20) within said housing. A non-rotatable washer element (30) is inserted between confronting end faces of the side gears (18, 18') to reduce the sliding velocity between the washer and each side gear to one-half of the relative sliding velocity between the side gears, thereby reducing and/or controlling friction between the side gears and reducing differences in bias ratios associated with opposite directions of differentiation.

36 Claims, 3 Drawing Sheets

FRICTION REDUCTION IN A DIFFERENTIAL ASSEMBLY

TECHNICAL FIELD

This invention relates to differential gear assemblies of the type which may include worm or helical-type gears mounted on crossed, non-intersecting axes and particularly, to a novel washer for use in such assemblies to control friction between side, or axle drive, gears in such assemblies, and to alleviate and/or control bias ratio imbalance.

BACKGROUND

Conventional differential assemblies utilize four interengaged bevel gears that rotate about two orthogonal axes. In contrast, the differential assembly which is associated with this invention, is of the type that does not utilize bevel gears, and is generally of the design shown in U.S. Pat. No. 2,859,641, issued Nov. 11, 1958 in the name of Gleasman. This patent is incorporated herein by reference to the extent necessary to provide specific details of the structure of the differential assembly.

This type of differential includes a gear housing, a pair of drive axles received in bores formed in the sides of the housing, and a differential gear arrangement mounted centrally in the housing for driving the axles. The rotatable gear housing body includes a flange formed at one end for receiving a ring gear or other means for providing power input to the differential from the drive shaft of the vehicle in a conventional manner. The gear housing is typically provided with a removable cap at its other end.

The gear arrangement includes a pair of helical worm or side gears, coupled to each axle end as drive gears, together with so called balancing or transfer gears associated with each of the side gears and in mesh with each other for transferring and dividing torque between the axle ends. The transfer gears are mounted in pairs within slots, or windows, formed in the main body portion of the housing, and each transfer gear of a pair rotates on an axis of rotation that is substantially parallel to a tangent of the envelope of an associated axle drive gear.

The transfer gears are in reality combination gears, i.e., the middle portion of each gear constitutes a worm wheel portion while the outer ends of the gear are formed with integral spur gear portions. The arrangement is such that, for any given pair of combination gears, the worm wheel portion of a first combination gear meshes with one side gear while the worm wheel portion of a second combination gear meshes with the other side gear, and the spur gear portions of the respective combination gears mesh with each other.

In one example of this type differential assembly, a set of three combination gears are arranged substantially in a first single plane at approximately 120° intervals about the periphery of each side gear, each of the three combination gears being paired with a combination gear of a second set of three combination gears similarly arranged with respect to the second side gear in a second single plane parallel to the first plane.

The present invention relates to differential assemblies of the type described above, and particularly to the frictional relationship between the normally directly or indirectly abutting end faces of side gears which have helix angles inclined in the same direction with respect to their axes of rotation. In such assemblies, when power is applied to the differential housing, both side gears are thrust in the same direction along their aligned axes toward one end of the differential gear housing. In this regard, it is to be noted that the side gear helix angles are generally selected so that when power is applied to the differential gear housing to effect forward movement of a vehicle, both side gears are thrust toward the flange end of the housing. This arrangement, however, produces different bias ratios for different directions of relative drive axle rotation. This invention seeks to control friction at the interface between side gears and to reduce bias ratio imbalance without significantly reducing overall, or average, bias ratio of the differential assembly.

Prior to explaining the improved aspects of the differential assembly, a brief discussion of frictional resistance, bias ratio, and bias ratio imbalance will prove helpful to an understanding of the invention. For ease of discussion herein, the side gear closest to the flange end of the differential housing will be referred to as the "bottom" side gear; the side gear closest to the cap end of the housing will be referred to as the "top" side gear; and the flange end of the differential gear housing is assumed to be on the left side of the housing as viewed from the rear of the vehicle. Moreover, with respect to examples discussed herein, forward movement of the vehicle is assumed.

Bias ratio is a measure of torque distribution between drive axles which can be maintained by relatively rotating drive axles, and is expressed as a quotient of the amount of torque in the drive axle having the most torque divided by the amount of torque in the other drive axle. Bias ratio is produced by frictional resistance in a differential which restricts the transmission of torque between drive axles. Generally, frictional resistance causes a percentage reduction in the amount of torque that is transferable between drive axles. The magnitude of this reduction is proportional to the frictional resistance.

Torque transfer through the differential occurs from the drive axle having the larger amount of torque to the drive axle having the smaller amount of torque. Accordingly, the drive axle which includes the larger amount of torque may also be considered as the "input" axle and the drive axle which includes the smaller amount of torque may be considered as the "output" axle. In this context, the terms "input" and "output" refer only to transfers of torque between drive axles and are not related to torque transfers between the differential housing and the drive axles collectively.

It is known, for example, that the drive axle connected to the inside wheel in a turn exerts a greater resistance to rotation of the differential housing than the drive axle connected to the faster rotating outside wheel. Accordingly, in opposite directions of turns, one drive axle is loaded more than the other. That is, in one direction of relative drive axle rotation (e.g., a right turn) the drive axle coupled to the top side gear is loaded more than the drive axle coupled to the bottom side gear and, in the opposite direction of relative drive axle rotation (e.g., left turn), the drive axle coupled to the bottom side gear is loaded more than the drive axle coupled to the top side gear. This differential drive axle loading in opposite directions of relative drive axle rotation may result in different bias ratios being associated with such different directions of drive axle rotation. This condition is termed bias ratio imbalance.

Since the problem is one in which bias ratio is decidedly higher in one direction of relative drive axle rotation than the other, it may be understood that frictional resistance in the differential is greater in the direction of relative drive axle rotation associated with the higher bias. However, the same frictional surfaces are known to be in contact in both directions of relative rotation. Frictional forces generated by frictional surfaces are determined by the coefficients of friction of the respective contacting surfaces and the normal forces applied to the surfaces. Since the frictional properties of the contacting surfaces (i.e., coefficients of friction) do not change between opposite directions of drive axle rotation, it may be further understood that differences in frictional resistance between the opposite directions of drive axle rotation are associated with changes in the normal forces applied to the frictional surfaces.

In other words, in the high bias direction of relative drive axle rotation, normal forces applied to the frictional surfaces in the differential are generally higher than in the low bias direction of relative drive axle rotation. Forces are applied to the frictional surfaces of the differential largely because of reaction forces generated at the mounting surfaces of the gearing in the differential. While there are frictional forces generated at each gear mesh, it is understood that the problem of bias ratio imbalance originates at particular mounting surfaces. It is well known, for example, that in order for gears to transmit power, the gears must be supported with all of their reactions contained. Mounting surfaces within the differential have frictional properties, and the normal forces which are applied against the mounting surfaces are, in fact, reaction forces which are required to contain the differential gearing in its operative position. From the above, it follows that reaction forces within the differential required to contain the gearing are larger in the high bias direction of relative drive axle rotation than in the low bias direction.

Typically, the largest reaction forces generated within the differential are side gear thrust forces. It is known that such thrust forces may be calculated at the point of mesh on the side gears. A first component (tangential) of the force applied at the point of mesh either contributes to the rotation of the side gear or conveys rotation of the side gear to an enmeshed gear member, and a second component (axial) of the applied force thrusts the side gear in a direction along its axis. The ratio of the axial force to the tangential force is equal to the tangent function of the side gear helix angle as given by the equation below:

$$W_x/W_t = \tan(\text{psi}) \qquad (1)$$

where "$W_x$" is the axial force, "$W_t$" is the tangential force and "psi" is the helix angle. Thus, the axial thrust of the side gears which must be constrained by mounting surfaces within the differential may be understood to be a product of the tangential driving force of each side gear multiplied by the tangent function of the respective side gear helix angles.

As may be expected, the reaction surfaces which constrain the axial thrust of the side gears are located opposite the end faces of the side gears. The interface between the bottom side gear and housing is used to constrain the axial movement of both the top side gear and bottom side gear. The interface between side gears is used to constrain axial movement of the top side gear.

The effect of the frictional forces generated at the side gear interfaces is to either (a) decrease the tangential driving load conveyed by a side gear or (b) increase the tangential driving load required to cause its rotation. Keeping in mind that the tangential driving loads associated with the two side gears are related through the side gear helix angle to the frictional resistance to relative drive axle rotation within the differential, it will be understood that the tangential driving loads associated with one direction of relative drive axle rotation are larger than the tangential driving loads associated with the opposite direction of relative drive axle rotation.

The problem may be simplified or reduced to its essential components by considering the differential to be frictionless except at the two side gear interfaces. In accordance with conventional practices, the two side gears may be considered to be equal in diameter and include equal helix angles. Under these conditions, the tangential driving loads of each side gear are equal in magnitude. Thus, it remains to be shown only that in one direction of relative drive axle rotation, the tangential driving loads are greater than in the opposite direction of relative drive axle rotation.

As previously explained, in one direction of relative drive axle rotation, the drive axle coupled to the top side gear is considered as "input" to the differential, i.e., the drive axle connected to the top side gear has the larger amount of torque. In this case, the tangential driving load acting at the mesh of the top side gear is reduced with respect to the load applied to the "input" axle by the amount of resistance to top side gear rotation developed at the interface between side gears.

This may be readily shown by way of an equation by taking advantage of a number of mathematical expedients. First, forces at the mesh of the respective side gears are considered to act at a unit distance from the side gear axis of rotation. This enables the interchange of units of force and torque. Second, the side gear helix angles may be considered equal to forty-five degrees. Since the tangent of forty-five degrees is equal to unity, tangential and axial forces acting at point of mesh of the side gears are equal. All frictional forces at the end faces of the side gears are also assumed to be acting at a unit radius as well. Accordingly, the tangential component of the top (and bottom) side gear mesh is equal to:

$$W_t = A_i - (W_t * u_2) \qquad (2)$$

where $A_i$ is the input load or torque on the drive axle associated with the top side gear and $u_2$ is the coefficient of friction at the interface between the top side gear and the bottom side gear.

Since frictional forces have been discounted elsewhere in the differential, it is also now possible to express the tangential driving load of the bottom side gear in terms of its relationship with the output axle. The portion of the tangential load of the bottom side gear mesh which is received by the output axle is reduced by friction generated at both the interface between side gears as well as friction generated at the interface between the bottom side gear and the housing. This relationship may be expressed as follows:

$$W_t = A_o + 2(W_t * u_1) + (W_t * u_2) \qquad (3)$$

where $A_o$ is the output load or torque on the drive axle associated with the bottom side gear and $u_1$ is the coefficient of friction at the interface between the bottom side gear and the differential housing. It is now possible to algebraically transform equations (2) and (3) as equalities of each axle torque.

$$A_i = W_t(1+u_2) \qquad (4)$$

$$A_o = W_t(1-2u_1-u_2) \qquad (5)$$

Thus, the bias ratio when the drive axle associated with the top side gear is considered as "input" may be expressed as follows:

$$\frac{A_i}{A_o} = \frac{1+u_2}{1-2u_1-u_2} \qquad (6)$$

In the opposite direction of differential rotation, the drive axle associated with the bottom side gear is considered input to the differential. The tangential driving load received by the bottom side gear is reduced by frictional forces acting to restrict bottom side gear rotation at both the interface between the bottom side gear and housing and the interface between side gears. This relationship may be summarized as follows:

$$W_t = A_i - 2(W_t * u_1) - (W_t * u_2). \qquad (7)$$

It can now be seen that the tangential driving load at the side gear mesh is reduced with respect to equation (2) by the term "$2(W_t * u_1)$." Accordingly, it may be anticipated that frictional forces which resist the transfer of torque between drive axles are larger in the direction of relative drive axle rotation associated with the input axle being coupled to the top side gear.

Continuing the mathematical derivation, the tangential driving load at the side gear mesh may also be expressed in connection with the output axle associated with the top side gear. In this case, the output load or torque is reduced from the tangential driving load at the top side gear mesh by frictional forces generated at the interface between the side gears. This may be mathematically expressed as follows:

$$W_t = A_o + (W_t * u_2). \qquad (8)$$

Algebraic transformation may be used to set equations (7) and (8) equal to respective axle torques as follows:

$$A_i = W_t(1+2u_1+u_2) \qquad (9)$$

$$A_o = W_t(1-u_2). \qquad (10)$$

Thus, the bias ratio when the drive axle coupled to the bottom side gear is considered as input may be expressed as follows:

$$\frac{A_i}{A_o} = \frac{1+2u_1+u_2}{1-u_2}. \qquad (11)$$

Given that the coefficients of friction do not change between opposite directions of drive axle rotation, it may now be demonstrated by comparison of equations (6) and (11) through the repetition of examples in the ordinary range of coefficient values (e.g., .01 to .2) that the bias ratio associated with input to the top side gear is larger than the bias ratio associated with input to the bottom side gear. The bias ratios between opposite directions of drive axle rotation tend to become closer in value but lower in magnitude as the coefficients of friction are reduced.

It is already known from U.S. Pat. No. 4,191,071 to reduce the coefficient of friction ($u_1$) at the interface between the bottom side and housing which has the effect of decreasing the difference between bias ratios associated with opposite directions of differential rotation. However, overall bias ratio is also reduced. This may be undesirable in applications in which higher bias ratios are needed. Further, there are practical limitations relating to cost and the availability of bearings which can sustain anticipated loads which limit the amount the coefficient of friction at this interface can be reduced.

Similar "torque equalizing" thrust bearings are disclosed in U.S. Pat. Nos. 4,491,035 and 2,859,641.

SUMMARY OF THE INVENTION

This invention relates to an improvement over other known approaches (e.g., U.S. Pat. No. 4,191,071) for minimizing bias ratio imbalance in the sense that it offers a further reduction in bias ratio imbalance without significantly decreasing overall bias ratio, while accomplishing a further important objective of controlling friction between side gears.

A washer fixed against rotation with respect to the differential housing is mounted at the interface between side gears. This creates two independent frictional interfaces between the side gears. One of these interfaces is defined between the top side gear and one side of the washer and the other interface is defined between the bottom side gear and the opposite side of the washer. Thus, two different coefficients of friction may be associated with the opposite sides of the washer.

The coefficient of friction associated with the interface between the top side gear and washer is now referenced as "$u_{2t}$" and the coefficient of friction associated with interface of the washer with the bottom side gear is referenced as "$u_{2b}$." This necessitates changes in equations (2) through (11) to appropriately substitute either $u_{2t}$ or $u_{2b}$ for $u_2$. These modified equations are rewritten below as equations (2b) through (11b), respectively.

$$W_t = A_i - (W_t * u_{2t}) \qquad (2b)$$

$$W_t = A_o + 2(W_t * u_{2b}) \qquad (3b)$$

$$A_i = W_t(1+u_{2t}) \qquad (4b)$$

$$A_o = W_t(1-2u_1-u_{2b}) \qquad (5b)$$

$$\frac{A_i}{A_o} = \frac{1+u_{2t}}{1-2u_1-u_{2b}} \qquad (6b)$$

$$W_t = A_i - 2(W_t * u_1) - (W_t * u_{2b}) \qquad (7b)$$

$$W_t = A_o + (W_t * u_{2t}) \qquad (8b)$$

$$A_i = W_t(1+2u_1+u_{2b}) \qquad (9b)$$

$$A_o = W_t(1-u_{2t}) \qquad (10b)$$

$$\frac{A_i}{A_o} = \frac{1 + 2u_1 + u_{2b}}{1 - u_{2t}} \quad (11b)$$

Our earlier comparison of equations (2) and (7) revealed that the tangential driving load at the side gear mesh is reduced in equation (7) with respect to equation (2) by the term "$2(W_t*u_1)$." Although this term is still present in corresponding equation (7b) other terms also now differ between equations (2b) and (7b). That is, input axle torque to the top side gear in equation (2b) is now reduced by the term "$(W_t*u_{2t})$" whereas input axle torque to the bottom side gear in equation (7b) is reduced by the term "$(W_t*u_{2b})$." It may now be appreciated that if coefficient $u_{2t}$ is increased and coefficient $u_{2b}$ is decreased, this will tend to balance differences between the tangential driving loads at the side gear mesh associated with opposite directions of torque transfer through the differential.

A comparison of equations (6b) and (11b) by example reveals that these changes in the coefficients $u_{2t}$ and $u_{2b}$ have opposite effects on the bias ratios associated with opposite directions of relative drive axle rotation. In the case of equation (6b), an increase in coefficient $u_{2t}$ associated with a decrease in coefficient $u_{2b}$ tends to lower bias ratio. The same change in the value of the coefficients in equation (11b) tends to raise bias ratio. If these respective coefficients are adjusted with respect to coefficient $u_1$ so that the terms $(W_t*u_{2t})$ and $2(W_t*u_1)+(W_t*u_{2b})$ of equations (2b) and (7b) are equal in value, then the bias ratios in both directions of drive axle rotation are balanced. Alternatively, the respective coefficients of friction associated with opposite sides of the washer may be adjusted for other purposes including raising or lowering overall bias ratio or contributing to a further imbalance in bias ratio.

Although different coefficients may be used on opposite sides of the washer to alleviate the problem of bias ratio imbalance, it is also a purpose of this invention to effect an overall reduction in friction, and, to this end, in another exemplary embodiment of the invention, a friction reduction coating can be applied to both washer surfaces. This, of course, would only indirectly improve the imbalance problem. Also, the use of a non-rotatable washer serves to divide the interface between side gears into two separate interfaces to better accommodate the generation of heat and reduce wear at this location of the differential. The relative rotational speed between each side gear and the fixed washer is only one-half of the relative rotational speed between the two side gears. This limits the amount of heat generated at each side gear end face and divides wear over a second interface between side gears.

In accordance with an exemplary embodiment of this invention, the friction reducing washer assembly comprises a generally annular disc provided with at least two, and preferably three, radially outwardly directed projections which engage surfaces on the main body portion of the housing between adjacent slots or windows, to both center and prevent rotation of the washer. More specifically, the radially outermost surface of each washer projection is provided with an outwardly facing, shallow V-shaped recess configuration which engages and receives a complementary shaped, radially inwardly directed surface portion of the gear housing. In addition, non-parallel edge surfaces of each washer projection, which taper toward the V-shaped recess configuration from the annular disc body, are chamfered from either side to form tapered edges designed to preclude interference with adjacent pairs of combination gears.

The present invention contemplates coating the washer surface which engages the bottom side gear end face with a suitable friction reducing material, such as Teflon ™. It will be appreciated that the same differential friction effect, i.e., a lower coefficient of friction on the side of the washer engaging the bottom side gear end face, may be achieved by coating the washer surface which engages the top side gear end face with a friction increasing coating. And, as previously indicated, both sides of the washer may be coated with a friction reducing material to effect a greater reduction in overall friction but with less impact on bias ratio imbalance.

In another exemplary embodiment of the invention, the washer may be constructed of two, mirror-image elements fixedly secured, by spot welds for example, in back-to-back relationship. The washer is otherwise similar to the construction discussed hereinabove.

In still another embodiment of the invention, the friction reducing washer may include a three-part assembly including upper and lower annular washer elements received in recesses formed in an intermediate holder provided with radially outwardly directed projections similar to those previously described.

It is also contemplated that the center portion of the washer assembly, whether it be of the one, two or three part configuration, may be solid, so as to provide a useful heat sink for heat generated at the respective interfaces with the side gears. In such case, it is desirable to provide an array of small holes in the solid center portion to permit flow of lubricant about the interface of the side gears and washer assembly.

The present invention will be further understood from the accompanying drawings and detailed description of the presently preferred exemplary embodiments which follow.

PRESENT BEST MODE FOR CARRYING OUT THE INVENTION

Figure 1:
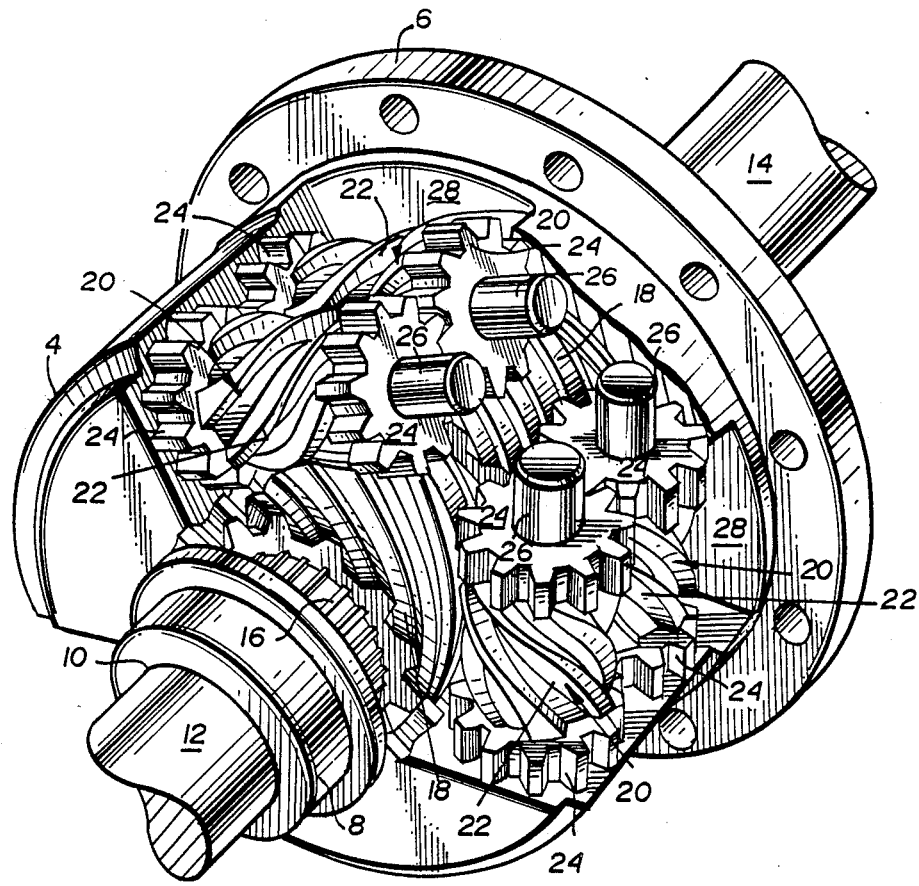
FIG. 1 is a perspective view of a known type of differential gear assembly, with parts broken away in section to show the internal gear structure.

Referring to FIG. 1, a known differential gear assembly generally similar to the differential gear assembly of this invention includes a differential gear housing 4 provided with an end cap 5 at one end and a flange 6 at the other end. The flange 6 is adapted to mount a ring gear (not shown) for receiving power input from the drive train of a vehicle in a conventional manner. The differential housing 4 also includes a pair of spaced apart trunnions 8 (only one of which is shown) which are adapted to receive bearings by which the differential gear housing is rotatably mounted inside a conventional axle housing.

The differential gear housing 4 also includes a pair of axle receiving bores 10 (only one of which is shown) which are at least partially defined by the trunnions 8 and through which axle shaft ends 12, 14 extend into engagement with the differential gear assembly inside the housing. In particular, axle shaft ends 12, 14 include external splines 16 which engage mating internal splines of helical worm gears 18, 18', respectively. These worm gears are hereinafter referred to as side gears.

Each side gear 18 or 18' meshes with three balancing or transfer gears 20 which are arranged at 120° intervals about the periphery of the side gear, and which are arranged generally tangentially to, and engaged with, the pitch surface of the side gear. It is understood with reference to FIG. 1, that only two of the three transfer gears associated with each side gear 18 or 18' are shown. Each of these transfer gears, hereinafter referred to as combination gears, is formed with a middle portion which constitutes an hourglass worm wheel portion 22 and integral end portions which constitute spur gear portions 24. It will be appreciated that each side gear meshes with worm wheel portions of three associated combination gears 20. At the same time, the spur gear portions 24 of each combination gear associated with one side gear mesh with the spur gear portions of adjacent combination gears associated with the other of the two side gears. It is this arrangement, sometimes termed a "crossed-axis compound planetary gear complex" which transfers and divides torque between axle shaft ends 12, 14.

Each combination gear 20 is mounted for rotation about a shaft 26, the ends of which extend beyond the gear and serve to mount the gear within the gear housing 4. Since each of the three combination gears 20 associated with one side gear 18 is paired with a combination gear associated with the other side gear, the gear housing 4 is formed with three peripherally arranged "windows" or slots 28 extending radially inwardly from the periphery of the housing 4, each window or slot 28 receiving and mounting one pair of combination gears.

As further illustrated in FIG. 1, the helix angles of the respective side gears 18, 18' are inclined in the same direction with respect to their axes of rotation.

Consistent with the previous discussion, side gear 18', closest to the housing flange 6, is referred to herein as the bottom side gear, and side gear 18 closest to the end cap 5, is referred to herein as the top side gear.

Figure 2:
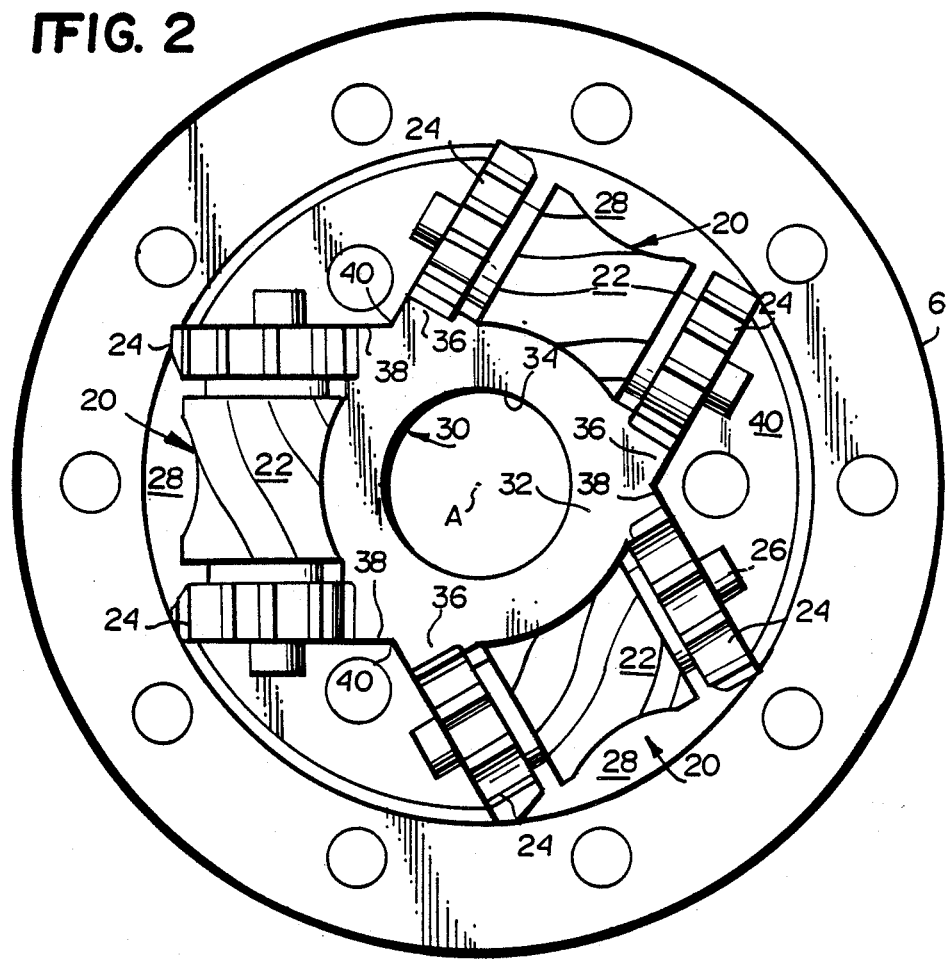
FIG. 2 is a transverse cross-sectional view taken at the interface of the side gears of the differential assembly shown in FIG. 1 but which includes a friction reducing washer in accordance with a preferred exemplary embodiment of this invention.
Figure 6:
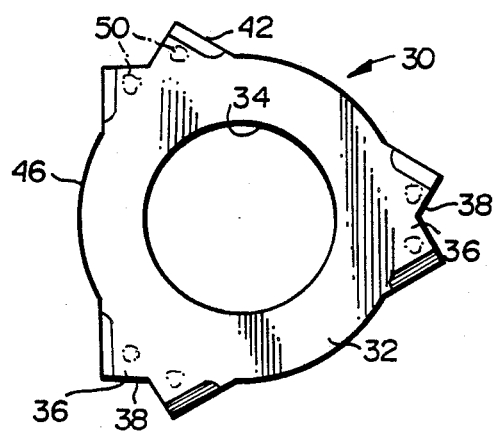
FIG. 6 is a plan view of a friction reducing washer of the type shown mounted in the differential gear assembly of FIG. 2.

Referring now to FIGS. 2 and 6, a friction reducing washer 30 in accordance with an exemplary embodiment of this invention is shown. In FIG. 2, the washer is shown mounted in place within a differential worm gear assembly of the type described above. The washer has a first, annular portion 32, the outer diameter of which corresponds substantially to the outer diameter of the side gears 18, 18'. In this embodiment, the washer 30 is shown with a cut-out center 34 as in conventional washer construction.

There are formed at 120° intervals about the periphery of the annular center portion 32, three radially outwardly directed projections 36, only one of which need be described in detail. Each projection is provided with a radially outwardly facing, shallow V-shaped centering recess 38 which is configured to engage a complementary-shaped projecting surface 40 formed in the gear housing 4 at the juncture of adjacent windows or slots 28. As can best be seen in FIGS. 2, 3 and 6, non-parallel edge surfaces along the sides of the projections 36, taper toward the recess 38. These edges are also chamfered or tapered at 42 to prevent undesirable contact between adjacent combination gears and the washer 30 as is more clearly shown in the FIG. 4 and 5 embodiments.

It will be appreciated that when the washer 30 is installed between the side gears 18, 18' with V-shaped notches 38 engaging respective housing projections 40, the washer will be centered, but prevented from rotating, about the longitudinal axis A. At the same time, the unique configuration of the washer permits axial motion along the axis A so that the washer may follow any slight axial shifting of the side gears. By preventing the washer from rotating, it will be understood that the sliding velocity between the washer and each side gear is limited to one-half the relative sliding velocity between the side gears.

Figure 3:
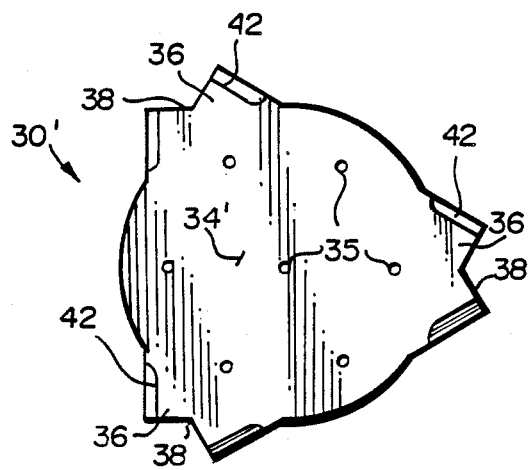
FIG. 3 is a plan view of a friction reducing washer in accordance with another exemplary embodiment of this invention.

In FIG. 3, a washer 30' is illustrated which is similar in most respects to the washer illustrated in FIG. 2, but which has a solid center portion 34'. A solid center provides a useful heat sink for heat generated at the interfaces with the side gears. Where the solid center configuration is employed, it is desirable to provide an array of small apertures 35 which will enable lubricant to flow through and around the washer. This assures a more uniform distribution of lubricant to the frictional surfaces and provides a means for carrying away heat from the washer.

Figure 4:
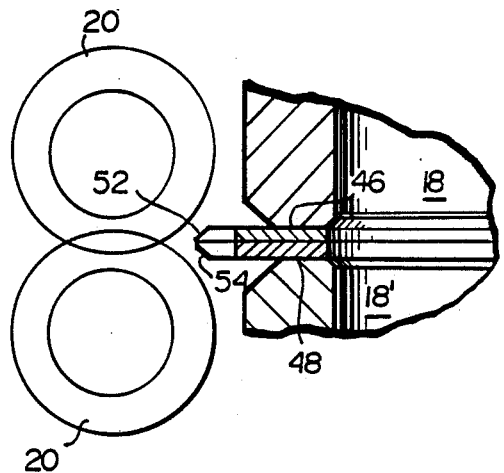
FIG. 4 is a partial cross-sectional view of a two-element friction reducing washer in accordance with another embodiment of the invention, and further illustrating the positional relationship of the washer to associated side gears and an adjacent pair of combination gears shown in schematic form.

In FIG. 4, there is disclosed another exemplary embodiment of the friction reducing washer according to this invention. In this embodiment, a two-part washer is shown wherein a pair of mirror-image washer elements 46, 48 are assembled in back-to-back relationship and held together with spot welds 50 (for ease of understanding only, the spot welds are shown in phantom in FIG. 6) in the projection portions 36. Chamfered edges 52, 54 on the respective elements 46, 48 taper toward one another as described above with respect to the embodiment illustrated in FIG. 3. A pair of combination gears 20 is shown in schematic form adjacent the side gears 18, 18'. From this view, it is apparent how the chamfered edges 52, 54 preclude interference with adjacent combination gears.

Figure 5:
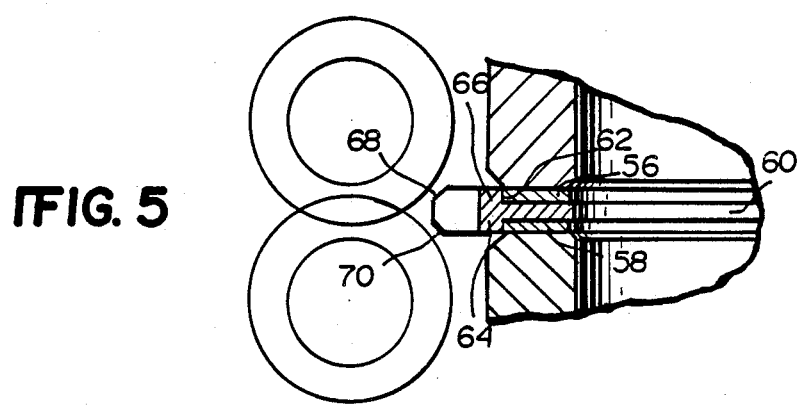
FIG. 5 is a partial cross-sectional view similar to that shown in FIG. 4 but incorporating a three-element washer in accordance with still another embodiment of the invention.

In FIG. 5, a still further exemplary embodiment of the friction reducing washer is illustrated. In this embodiment, upper and lower annular washer members 56, 58 are fixedly secured by any suitable means such as, for example, spot welds, within circular recesses 62 formed in opposite sides of a washer holder 64. The holder 64 is provided with radially outwardly extending projections and chamfered edges 68, 70 similar to those of the previously described embodiments.

As discussed hereinabove, the side gear helix angles are selected so that when power is applied to the differential housing to effect forward movement of a vehicle, both side gears 18, 18' are thrust toward the end of the differential housing provided with flange 6.

If the principal objective is to alleviate the problem of bias ratio imbalance, the washer surface facing and engaging the bottom side gear end face may be coated with a friction reducing material, which may be a known polytetrafluoroethylene composition such as Teflon TM. It will be understood, of course, that any suitable friction reducing composition may be used. Alternatively, any suitable friction increasing surface coating may be added to the washer surface facing and engaging the top side gear 18. It will be further understood that with respect to the FIG. 4 embodiment, the lower element 48 may be formed of a metal material having a lower coefficient of friction than the upper element 46. Similarly, in the FIG. 5 embodiment, lower washer member 58 may be formed of a metal material having a lower coefficient of friction than upper washer member 56. Regardless of which approach is taken, it is important that the coefficient of friction at the interface between the washer and the bottom side gear 18' be lower than the coefficient of friction at the interface between the washer and the top side gear 18.

Where, on the other hand, overall reduction in friction is paramount, the washer surfaces engaging both side gears may be provided with a friction reduction coating so that the frictional resistance to rotation at the side gear interfaces is reduced and/or controlled. As a secondary result, differences in bias ratio associated with opposite directions of rotation are also reduced, although not to the same extent as in the embodiment described above where differential coefficients of friction are provided.

Accordingly, as a result of this invention, problems associated with both bias ratio imbalance and heat generation are alleviated, contributing to more uniform and reliable vehicle handling throughout a full range of operating conditions.

While the invention has been described with respect to what is presently regarded as the most practical embodiments thereof, it will be understood by those of ordinary skill in the art that various alterations and modifications may be made which nevertheless remain within the scope of the invention as defined by the claims which follow.

What is claimed is:

1. A differential gear assembly of the type which includes a differential gear housing having means for receiving a pair of axle ends together with a pair of substantially axially aligned side gears coupled to said pair of axle ends for rotation therewith, said side gears having confronting end faces and helix angles inclined in the same direction with respect to the axes of rotation thereof, and friction reducing means having opposite sides in engagement with said confronting end faces of said side gears, said friction reducing means including means for preventing rotation of said friction reducing means relative to said gear housing, characterized in that said opposite sides of said friction reducing means include surfaces with different coefficients of friction.

2. A differential gear assembly as defined in claim 1 and further characterized in that said friction reducing means comprises at least one, substantially flat disc member inserted between and in engagement with said side gear end faces.

3. A differential gear assembly as defined in claim 2 and further characterized in that said at least one disc member is provided with at least two radially outwardly directed projections for engaging said gear housing.

4. A differential gear assembly as defined in claim 3 and further characterized in that each of said projections is formed with radially outwardly directed, non-parallel side edges, said edges being 5. A differential gear assembly as defined in claim 4 and further characterized in that said radially outwardly directed projections are provided with V-shaped recesses at radially outermost ends thereof adapted to engage complementary-shaped V-shaped projections formed in said gear housing.

6. A differential gear assembly as defined in claim 2 and further characterized in that said disc member is formed with a hollow center portion.

7. A differential gear assembly as defined in claim 2 and further characterized in that said disc member is formed with a solid center portion provided with a plurality of apertures.

8. A differential gear assembly as defined in claim 1 wherein said friction reducing means comprises two mirror image disc members fixed together in back-to-back relationship.

9. A differential gear assembly of the type which includes a differential gear housing having means for receiving a pair of axle ends together with a pair of substantially axially aligned side gears coupled to said pair of axle ends for rotation therewith, said side gears having confronting end faces and helix angles inclined in the same direction with respect to the axes of rotation thereof, and friction reducing means comprising at least one substantially flat disc member inserted between and in engagement with said confronting side gear end faces and including means for preventing rotation of said disc member relative to said gear housing, characterized in that said substantially flat disc comprises a washer holder provided with annular recesses on opposite sides thereof, each recess receiving therein an annular washer member.

10. A differential gear assembly as defined in claim 9 and further characterized in that said washer holder is provided with at least two radially outwardly directed projections for engaging said gear housing.

11. A differential gear assembly as defined in claim 10 and further characterized in that each of said projections is formed with radially outwardly directed, non-parallel side edges, said edges being chamfered to preclude interference with said combination gears.

12. A vehicle differential gear assembly comprising a differential gear housing provided with a flange at one end thereof adapted for engagement with power input means, said housing also including means for receiving a pair of substantially axially aligned rotatable axle ends; a top side gear disposed within said housing and coupled to one of said axle ends for rotation therewith; a bottom side gear disposed within said housing and rotatably coupled to the other of said axle ends for rotation therewith, said bottom side gear located adjacent said gear housing flange; said top and bottom side gears rotatable about substantially aligned axes of rotation and having helix angles inclined in the same direction with respect to said axes of rotation such that, during forward movement of said vehicle, said top and bottom side gears are axially thrust toward said one end of said housing provided with said flange; and washer means having opposite sides in engagement with confronting end faces of said top and bottom side gears, said washer means including means for preventing rotation of said washer means relative to said gear housing, said assembly characterized in that one side of said washer means has a lower coefficient of friction than the other side of said washer means.

13. A differential gear assembly as defined in claim 12 and further characterized in that said washer means is provided with at least two radially outwardly directed projections.

14. A differential gear assembly as defined in claim 13 and further characterized in that said radially outwardly directed projections are provided with V-shaped recesses at radially outermost ends thereof adapted to engage complementary-shaped V-shaped projections formed in said gear housing.

15. A differential gear assembly as defined in claim 14 and further characterized in that said washer means comprises two mirror image disc elements fixed together in back-to-back relationship.

16. A differential gear assembly as defined in claim 13 and further characterized in that said projections are formed with chamfered non-parallel side edges.

17. A differential gear assembly as defined in claim 14 and further characterized in that said washer means comprises a washer holder provided with annular recesses on opposite sides thereof, each recess receiving therein an annular washer member.

18. A differential gear assembly for a vehicle comprising a differential gear housing having means for receiving a pair of axle ends substantially axially aligned side gears disposed within said gear housing and rotatably coupled to said axle ends, said side gears having confronting end faces and helix angles inclined in the same direction with respect to their respective axes of rotation, at least two combination gears associated with each said side gear, each of said combination gears including a centrally located worm wheel portion with spur gear portions formed at either end thereof, said combination gears being arranged in at least two pairs such that with respect to each pair, the worm wheel portion of one combination gear of a pair meshes with one side gear and the worm wheel portion of the other combination gear of the pair meshes with the other side gear, the spur gear portions of one combination gear of the pair meshing with the spur gear portions of the other combination gear of the pair, each said combination gear pairs arranged tangentially to the periphery of the worm gear and rotatably mounted in a gear window formed in said housing, characterized by the addition of friction reducing means having opposite sides in engagement with said confronting end faces of said side gears, said opposite sides having respective surfaces with differing coefficients of friction, and said friction reducing means including means for preventing rotation of said friction reducing means relative to said gear housing.

19. A differential gear assembly as defined in claim 18 and further characterized in that said friction reducing means comprises at least one, substantially flat disc member inserted between and in engagement with said side gear end faces.

20. A differential gear assembly as defined in claim 19 and further characterized in that said at least one disc member is provided with at least two radially outwardly directed projections for engaging said gear housing.

21. A differential gear assembly as defined in claim 20 wherein each of said projections is formed with radially outwardly directed, non-parallel side edges, said edges being chamfered to preclude interference with said combination gears.

22. A differential gear assembly as defined in claim 21 and further characterized in that said radially outwardly directed projections are provided with V-shaped recesses at radially outermost ends thereof adapted to engage complementary-shaped V-shaped projections formed in said gear housing.

23. A differential gear assembly as defined in claim 22 and further characterized in that two mirror image disc members are fixed together in back-to-back relationship.

24. A differential gear assembly as defined in claim 19 and further characterized in that said substantially flat disc comprises a washer holder provided with annular recesses on opposite sides thereof, each recess receiving therein an annular washer member.

25. A differential gear assembly as defined in claim 24 and further characterized in that said washer holder is provided with at least two radially outwardly directed projections for engaging said gear housing.

26. A differential gear assembly as defined in claim 25 and further characterized in that each of said projections is formed with radially outwardly directed, non-parallel side edges, said edges being chamfered to preclude interference with said combination gears.

27. A differential gear assembly as defined in claim 19 and further characterized in that said disc member is formed with a hollow center portion.

28. A differential gear assembly as defined in claim 19 and further characterized in that said disc member is formed with a solid center portion provided with a plurality of apertures.

29. Friction and wear reducing washer means for insertion between confronting side gear end faces in a differential assembly, said washer means having an annular disc body formed with at least one radially outwardly directed projection for engaging internal surfaces of a gear housing enclosing said differential assembly, characterized in that said disc body comprises two mirror image sections fixed together in back-to-back relationship, an exterior surface of one of said sections having a lower coefficient of friction than the exterior surface of the other of said sections.

30. Friction and wear reducing washer means as defined in claim 29 and further characterized in that said annular disc body is formed with three radially outwardly directed projections spaced at approximately 120° intervals about the periphery of said annular disc body.

31. Friction and wear reducing washer means as defined in claim 30 and further characterized in that each of said projections is formed with non-parallel side edges connected by a shallow V-shaped recess.

32. Friction and wear reducing washer means as defined in claim 31 and further characterized in that said non-parallel side edges are chamfered.

33. Friction and wear reducing washer means as defined in claim 29 and further characterized in that said annular disc body is formed with identical annular recesses on opposite sides thereof, each of said recesses receiving a washer element therein.

34. Friction and wear reducing washer means as defined in claim 33 and further characterized in that an exterior surface of one of said washer elements has a lower coefficient of friction than the exterior surface of the other of said washer elements.

35. Friction reducing washer means as defined in claim 34 and further characterized in that said exterior surface of said one of said washer elements has a friction reducing coating applied thereto.

36. Friction and wear reducing means as defined in claim 29 and further characterized in that said exterior surface of said one of said sections has a friction reducing coating applied thereto.

* * * * *